United States Patent Office 3,143,984
Patented Aug. 11, 1964

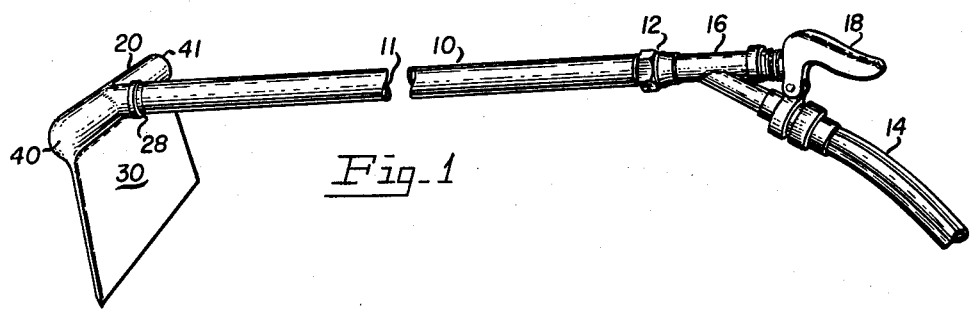
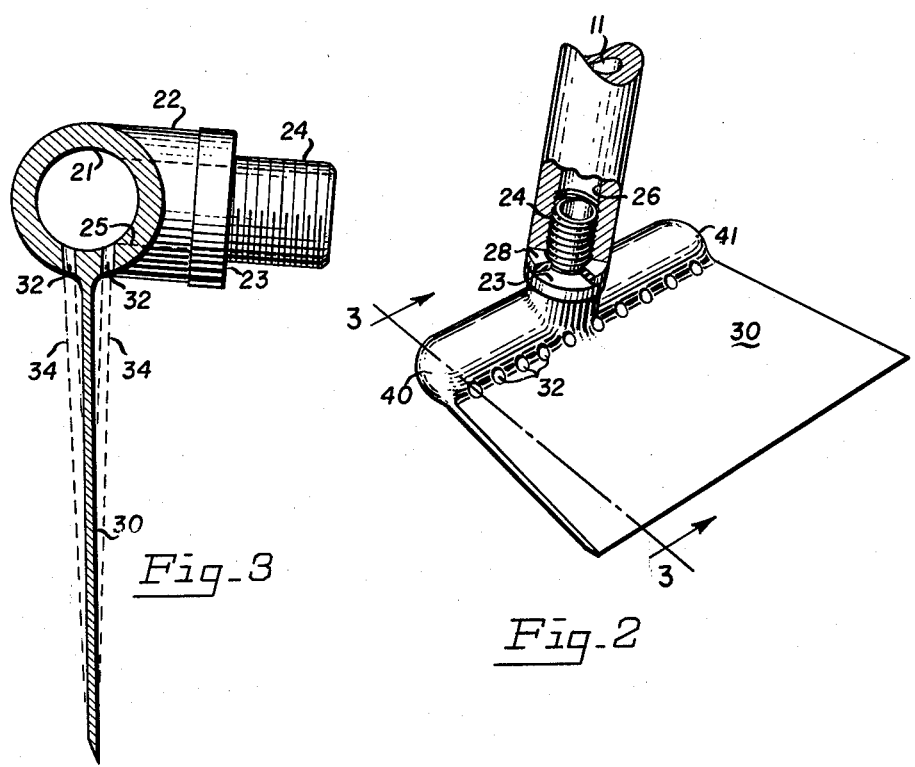

3,143,984
GARDEN TOOL
Henry Morasch, 2383 Lawrence Station Road,
Santa Clara, Calif.
Filed Oct. 22, 1962, Ser. No. 232,233
2 Claims. (Cl. 111—7.1)

This invention relates to a hand operated garden tool, and more particularly to a combination of a self-cleaning garden hoe and watering tool.

The need has long existed for a light, inexpensive, self-cleaning garden tool to cultivate and spot-water (applying water to a small area) gardens simultaneously. Particularly in those gardens in which many varieties of plants and flowers are grown together in close proximity, each one usually requires a different amount of moisture. Consequently, watering by sprinklers or by sprayers becomes wasteful since moisture penetration, in such area-watering, must be sufficient to meet the requirements of the deepest and most moisture loving plant.

Also in many gardens, the earth includes a large amount of clay and/or adobe making cultivation difficult because of the hardness of the ground when the earth is dry. Cultivation of such soil is usually undertaken only after soaking the ground so that the cultivating tool can more easily penetrate into the ground. However such earth has a tendency to stick or cling to the cultivating tool making cultivation rather hard on the arms of the gardener who has to lift the cultivating tool, such as a hoe, with heavy clumps of earth clinging thereto. Cultivation of the ground requires, for greatest effectiveness, a clean blade which easily and cleanly cuts into the ground to a desired depth.

All garden tools employed heretofore have been found wanting in one or more respects. Even those garden tools, which purport to be a combination of a cultivator and a watering tool, are limited in their application. For example, no combination tool, to the best of my knowledge, provides for the continual cleaning of the cultivating blade and permits spot-watering, as distinguished from forcible injection watering of portions below the surface (root watering).

It is therefore primary object of this invention to provide a garden tool which may be hand held by an operator and which is suitable for simultaneously cultivating and watering a selected small area of a garden.

It is also an object of this invention to provide a garden hoe having a blade which may be continually rinsed or washed down to prevent earth from sticking thereto, or in case earth is clinging to the blade to remove the same by washing off.

It is another object of this invention to provide a versatile garden tool useful for simultaneously watering and cultivating small areas of gardens.

It is a further object of this invention to provide a versatile, inexpensive combination watering and cultivating garden tool having a self-cleaning blade.

It is still another object of this invention to provide a garden tool useful for cultivating earth of all kinds, even if sticky or muddy, by working such ground with a blade is either continually or upon demand cleaned on both sides.

Other objects and a better understanding of the invention may be had by reference to the following description, taken in conjunction with the accompanying drawings, in which:

FIG. 1 is a perspective view of the garden tool of this invention having a garden hose connected thereto;

FIG. 2 is a perspective, enlarged, sectional and partially cutaway view, of the working tool portion of the garden tool shown in FIG. 1; and FIG. 3 is a cross sectional view taken along line 3—3 of FIG. 2.

Referring now to the drawing, in which like reference characters designate like parts, the garden tool there shown comprises a long tubular body 10 having an inner bore 11 forming a fluid passage, A hose connection 12 may be mounted directly to the upper end of tubular body 10 to which a hose 14 may be conveniently and releasably attached. In a preferred embodiment of this invention, a hand operated valve 16, having a valve actuating element 18, is mounted between hose connection 12 and hose 14 so that the user or operator of the garden tool of this invention may control, not only when water or another fluid is to flow through bore 11, but also the amount of fluid per unit time, i.e., the pressure as it is commonly called. Valve 16, therefore provides a means of adjusting water flow through bore 11.

A short tubular body 20, having an inner bore 21, is rigidly mounted across the lower end of long tubular body 10. An opening 25 is provided in the wall of short tubular body 20 which is so positioned and dimensioned to provide substantially unrestricted communication between inner bore 11 and inner bore 21. Also, the ends of short tubular body 20 are closed off by caps 40 and 41 or the like so that no fluid can escape therethrough.

As a practical matter, short tubular body 20 may be formed of T-section pipe having both ends of the cross bar sealed off and having its center leg 22 terminated, at a shoulder 23, with a threaded boss 24. For connecting short tubular body 20 to the end of long tubular body 10, the lower end of bore 11 is threaded at 26 for receiving threaded boss 24. To assure a watertight seal between bore 11 and opening 25 it has to be found convenient to utilize a conventional washer 28 made of some resilient material such as rubber or plastic or the like. Washer 28 is interposed between the end of body 10 and shoulder face 23 and body 20 is tightly threaded into bore 11.

Rigidly affixed and extending substantially along the complete length of short tubular body 20 is a hoe blade 30. Blade 30 may either be welded to the outer surface of short tubular body 20 to make approximately a right angle with center leg 22 or may be formed integrally with short tubular body 20 such as by casting, drop forging or the like.

Short tubular body 20 is provided on both sides of blade 30 with a plurality of closely spaced openings 32 arranged to form a row or a linear perforation immediately adjacent each surface of blade 30. Openings 32 pass through the wall of short tubular body 20 to communicate bore 21 with the surrounding space so that fluid may be expelled there-through.

Each individual opening 32 is formed to function as a nozzle for directing fluid for contact with the blade surfaces of blade 30. The individual water streams may impinge upon the blade surfaces either tangentially or at an acute angle as best seen in FIG. 3. The direction of the stream of water from openings 32 is indicated by broken lines 34 and show a glancing impact with the surface of blade 30. In this manner, both blade surfaces are continually exposed to a sheet of water and washed down which removes any particle of earth clinging thereto.

Openings 32 operate as nozzles and may be extended outwardly or may be formed with a portion acting like a dispensing nipple for directing water against the blade at a preselected angle for greatest cleaning action. Also, tubular body 20 need not be circular and may be formed of square, rectangular, triangular, or other cross section tubing. It is further within the contemplation of this invention to construct the combination of tubular bodies 10 and 20 as an integral single body such, as for example, a T-section having a long center leg to serve as the handle to which a hose fitting 12 may be attached.

In the operation of this invention, the user attaches hose 14 either directly, or preferably through valve 16, to long tubular body 10 and starts cultivating. If the user finds ground hard or requiring water for some other reason he depresses valve actuating element 18 until a convenient rate of water is discharged through openings 32 with which the ground may be softened. In case of formation of clumps sticking to blade 30 during cultivating, the user may depress the valve actuating element 18 for maximum water flow so that water is expelled through opening 32 with much force to wash off any particles sticking thereto. In case watering without cultivation is desired, a gentle flow of water through opening 32 will provide a short line source of water at the working edge of blade 30 for pinpoint application to flowers or plants.

There has been described a garden tool useful for cultivating or spot-watering or both simultaneously. The cultivating blade in the garden tool of this invention may be kept free of sticking particles of earth by continually washing both sides thereof.

What is claimed is:

1. A garden tool comprising:
   (a) a long tubular body;
   (b) a hand operated valve means mounted to one end of said long tubular body, said valve means being connectable with a hose;
   (c) a short straight tubular body disposed at right angles with and affixed at its midpoint across the other end of said long tubular body, said short tubular body having an opening in its wall for communicating the inner bore of said long tubular body with inner bore of said short tubular body, opposite ends of said short tubular body being sealed;
   (d) a hoe blade means affixed to and extending parallel along the length of said short tubular body, the surface of said blade means being substantially at right angles to said long tubular body; and
   (e) a plurality of discharge openings in the wall of said short tubular body and disposed to form a row substantially parallel to and on each side of said blade means, each said opening being formed and arranged to direct a stream of the fluid against the adjacent surface said blade means.

2. A garden tool comprising:
   (a) a long tubular body;
   (b) a hand operated valve means mounted to one end of said long tubular body, said valve means being connectable with a hose;
   (c) a short tubular body disposed at right angles with and affixed at its midpoint across the other end of said long tubular body, said short tubular body having an opening in its wall for communicating the inner bore of said long tubular body with inner bore of said short tubular body, opposite ends of said short tubular body being sealed;
   (d) a hoe blade means formed integrally with and extending parallel to the length of said short tubular body, the surface of said blade means being substantially at right angles to said long tubular body; and
   (e) A plurality of discharge openings in the wall of said short tubular body and disposed to form a row substantially parallel to and extending along the inner side of said blade means, said openings being formed and arranged to direct a stream of the fluid against the inner surface of said blade means.

References Cited in the file of this patent

UNITED STATES PATENTS

| | | |
|---|---|---|
| 194,231 | English et al. | Aug. 14, 1877 |
| 708,126 | Chase | Sept. 2, 1902 |
| 1,103,484 | Clarke | July 14, 1914 |
| 1,264,556 | Postel | Apr. 30, 1918 |
| 1,408,584 | Glasgow | Mar. 7, 1922 |
| 1,525,571 | Cypert | Feb. 10, 1925 |
| 1,598,811 | Perrin | Sept. 7, 1926 |
| 1,656,208 | La Vora | Jan. 17, 1928 |
| 1,764,699 | Simola | June 17, 1930 |
| 2,018,003 | Axtell | Oct. 22, 1935 |
| 2,181,189 | Lathan | Nov. 28, 1939 |
| 2,289,889 | Stick | July 14, 1942 |
| 2,638,730 | Davidson | Mar. 19, 1953 |
| 2,804,767 | Schoen | Sept. 3, 1957 |

FOREIGN PATENTS

| | | |
|---|---|---|
| 1,565 | Great Britain | 1854 |